United States Patent
Dragnea et al.

(10) Patent No.: US 11,542,926 B2
(45) Date of Patent: Jan. 3, 2023

(54) ONBOARD STRUCTURE CONVERTIBLE INTO A PROPELLANT FOR ELECTRIC PROPULSION

(71) Applicant: The Aerospace Corporation, El Segundo, CA (US)

(72) Inventors: Horatiu C. Dragnea, Plaza del Rey, CA (US); Henry Helvajian, Pasadena, CA (US); Kushal Patel, Whittier, CA (US)

(73) Assignee: THE AEROSPACE CORPORATION, El Segundo, CA (US)

(*) Notice: Subject to any disclaimer, the term of this patent is extended or adjusted under 35 U.S.C. 154(b) by 280 days.

(21) Appl. No.: 16/897,193

(22) Filed: Jun. 9, 2020

(65) Prior Publication Data

US 2021/0380283 A1 Dec. 9, 2021

(51) Int. Cl.
| | | |
|---|---|---|
| F03H 1/00 | (2006.01) | |
| F02K 9/08 | (2006.01) | |
| F02K 9/32 | (2006.01) | |
| F02K 9/36 | (2006.01) | |
| F02K 9/44 | (2006.01) | |
| F02K 9/42 | (2006.01) | |

(52) U.S. Cl.
CPC ............ *F03H 1/0037* (2013.01); *F02K 9/08* (2013.01); *F02K 9/32* (2013.01); *F02K 9/36* (2013.01); *F02K 9/42* (2013.01); *F02K 9/44* (2013.01)

(58) Field of Classification Search
CPC .... F03H 1/0037; F03H 1/0068; F03H 1/0075; F03H 1/0012; F03H 1/0031; F02K 9/08; F02K 9/32; F02K 9/346; F02K 9/36; F02K 9/42; F02K 9/44; F02K 9/974
See application file for complete search history.

(56) References Cited

U.S. PATENT DOCUMENTS

| | | | | |
|---|---|---|---|---|
| 3,032,437 A | * | 5/1962 | Pitchford | ............... F02K 9/20 427/407.1 |
| 3,815,359 A | * | 6/1974 | Thurston | ............... F02K 9/95 60/254 |
| 3,965,676 A | * | 6/1976 | Schaffling | ............ F02K 9/346 102/290 |

(Continued)

OTHER PUBLICATIONS

Dankanich, John, et al., "The Iodine Satellite (iSAT) Hall Thruster Demonstration Mission Concept and Development", American Institute of Aeronautics and Astronautics, https://ntrs.nasa.gov/search.jsp?R-20140012578.

Dankanich, John, et al., "The Iodine Satellite (iSAT) Project Development Towards Critical Design Review", 34th International Electric Propulsion Conference, Kobe, Japan, Jul. 4-10, 2015; https://ntrs.nasa.gov/search.jsp?R_20150016506.

(Continued)

*Primary Examiner* — William H Rodriguez
(74) *Attorney, Agent, or Firm* — LeonardPatel PC (57) ABSTRACT

A vehicle comprising a structure, a plurality of heating sources, and a transport mechanism. The structure is comprised of multiple materials, a composite such that some of the material constituents can be extracted leaving behind others via application of energy (such as de-alloying). The extracted material or materials are configured to be repurposed into a propellant. The plurality of heating elements surrounds or is embedded within the structure configured to convert the material into the propellant. The transport mechanism is configured to transport the propellant from the structure to a reservoir or to the propulsion system.

22 Claims, 10 Drawing Sheets

(56) References Cited

U.S. PATENT DOCUMENTS

| | | | | |
|---|---|---|---|---|
| 4,322,946 | A * | 4/1982 | Murch | B64G 1/406 60/203.1 |
| 4,594,945 | A * | 6/1986 | Alexandris | F02K 9/12 60/253 |
| 5,119,627 | A * | 6/1992 | Bradford | F02K 9/72 102/288 |
| 5,419,118 | A * | 5/1995 | McSpadden | F02K 9/26 60/250 |
| 6,609,363 | B1 * | 8/2003 | Dressier | F03H 1/0012 60/202 |
| 9,334,855 | B1 * | 5/2016 | Hruby | F03H 1/00 |
| 2013/0026920 | A1 * | 1/2013 | Szabo, Jr. | B64G 1/402 315/111.41 |
| 2013/0031888 | A1 * | 2/2013 | Fuller | F02K 9/12 29/890.01 |
| 2017/0226026 | A1 * | 8/2017 | Jones | C06B 45/14 |
| 2017/0234268 | A1 * | 8/2017 | Summers | F02K 9/10 60/251 |
| 2021/0277847 | A1 * | 9/2021 | Katanoda | F02K 9/72 |

OTHER PUBLICATIONS

Glogowski, Michael J., et al., "Electric Propulsion Systems Development & Integration Activity at Orbital ATK", 35th International Electric Propulsion Conference, Georgia Institute of Technology, Atlanta, GA, Oct. 8-12, 2017.

Polzin, Kurt, et al., "Propulsion System Development for the Iodine Satellite (iSAT) Demonstration Mission", Joint Conference of 30th International Symposium on Space Technology and Science, 34th International Electric Propulsion Conference and 6th Nano-Satellite Symposium, Hyogo-Kobe, Japan Jul. 4-10, 2015; https://ntrs.nasa.gov/search.jsp?R=20150016536.

Polzin, Kurt, et al., "The Iodine Satellite (iSAT) Propellant Feed System—Design and Development", 35th International Electric Propulsion Conference, Georgia Institute of Technology, Atlanta, GA, Oct. 8-12, 2017; https://ntrs.nasa.gov/search.jsp?R=20170012401.

Tam, Walter, et al., "Propellant Management Devices—Functional Design Methodologies and Verifications" Space Propulsion 2018, Seville, Spain, May 14-18, 2018.

* cited by examiner

ONBOARD STRUCTURE CONVERTIBLE INTO A PROPELLANT FOR ELECTRIC PROPULSION

FIELD

The present invention relates to a propellant generation system, and more particularly, to a propellant system that is configured to repurpose material onboard a vehicle into propellant (or gas, liquid or solid).

BACKGROUND

During a space mission, a space vehicle or spacecraft (hereinafter the "vehicle") carries propellant because it is the expulsion of the propellant material that enables a satellite to maneuver. When the propellant has been depleted, the vehicle loses the ability to maneuver (e.g. change linear or angular momentum), and in most cases, it is a mission ending affair. A key point being that all other functions of the vehicle could still be operative, but the utility of a propellant-less vehicle is limiting. To extend the mission, a servicing vehicle would have to dock with the handicapped vehicle and provide propulsion capabilities. Use of a servicing vehicle not only adds cost (i.e., an additional launch cost), but may also be impractical for an interplanetary vehicle.

The impracticality arises as a result of the large travel distances involved in interplanetary missions (i.e. for sending a service vehicle to rendezvous) or the added cost for "carrying along" a tender vehicle. In both instances, a large amount of propellant is expended for either the tender "ride-along" vehicle or the service vehicle. Moreover, there is the time lost factor for the service vehicle to rendezvous, as well as large amounts of propellant that must be spent to initiate docking maneuvers.

Thus, an improved system for providing and producing propellant is needed.

SUMMARY

Certain embodiments of the present invention may provide solutions to the problems and needs in the art that have not yet been fully identified, appreciated, or solved by current propellant system technologies. For example, some embodiments of the present invention generally pertain to a propellant system that extends a mission and/or reduces launch mass, translating in cost savings. In an embodiment, the propellant system re-purposes excess on-board mass into propellant. Propellant processing is performed autonomously by the vehicle itself, without the need of an external service vehicle.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention generally pertain to a propellant system that extends a mission and/or reduces launch mass, translating to cost savings. The propellant system in some embodiments re-purposes excess on-board mass into propellant. Propellant processing may be performed autonomously by the vehicle without the need of an external service vehicle.

In an embodiment, material, which may be used as propellant, is embedded as part of the structure (or structural elements) of the vehicle. The reason for this is because the structural elements are the most abundant mass resource onboard the vehicle. This implies that a solid-phase material is used during launch phase. Once the booster separates, (or perhaps even after passing through max-Q: the altitude where the vehicle is under the most stress), the vibration levels and induced stresses on the vehicle drop significantly. The vehicle is structurally over-designed and in the vacuum of space material strength requirements can be lower.

After launch and passing through max-Q (i.e., a maximum mechanical stress environment) and early orbit phase, the structural strength requirements of vehicle materials can be lower. With a lower structural strength requirement, the excess mass can be re-purposed. This may occur if the design of the structural material is such that a portion of it (e.g. embedded) can be converted to propellant (e.g., liquid/gas or solid form).

There may be several approaches to repurpose the embedded material into propellant. For example, the excess mass, if it is an integral part of the vehicle but can be selectively removed by, as for example, local heating and because it has a lower temperature threshold to form liquid or gas, it is selectively extracted, we name this extracted material, this propellant, the "embedded material". It should be appreciated that the lower temperature threshold depends on the embedded material such that it induces a phase change (e.g. to liquid form) to move the propellant to a second processing station. For example, if the embedded material is metallic, examples of embedded material include Indium (156° C., 312.8° F.), tin (232° C., 449.6° F.) or bismuth (272° C., 521.6° F.). If the embedded material is a polymeric material, then examples of embedded material include PEG: polyethylene oxide (66° C., 150.8° F.), poly-undecanamide or nylon 11 (187° C., 368.6° F.) or polyvinylidene fluoride (176° C., 348.8° F.). The optimum embedded material would withstand the space environment and use as little energy as possible for the desired phase change.

In another example, the walls of the vehicles are strengthened by reinforcing rods or filaments of high-strength material. These rods or filaments are then extracted and processed to form a liquid or gas for ease of transfer to the propulsion system. The rods are extracted by an electro-mechanical device with a grooved mechanism that impinges upon the filament and pushes it to a "digester". In this application, the digester is a material processing device configured to convert a solid filament rod into a liquid or gas phase. The rod may be converted into liquid or gas phase by, for example, heating. The liquid or gas phase may then be fed to the propulsion system. It may also be possible to directly convert a solid into a material phase useful for propulsion by electrical spark discharge, laser ablation and other forms of sputtering (electron beam).

In another embodiment, the structure of the vehicle is produced with an alloy. Upon heating of this alloy, a de-alloying process is initiated with the de-alloyed material becoming the propellant In this embodiment, de-alloying takes advantage of the difference in vapor pressure between alloy constituent elements. For example, when the alloy is heated, the alloy preferentially releases its constituent element with the highest vapor pressure in a gaseous form. By applying heat loads around the structure of the vehicle (or perhaps using the sun's thermal energy), a porous substrate is left behind as the de-alloyed material is repurposed into a liquid or gas. See, for example, FIG. 2, which is an image 200 illustrating a porous substrate, according to an embodiment of the present invention. In some embodiments, the structure may be composed of a metallic or metal foam which may be of a closed shell or an open shell.

Continuing with this example, the embedded material is extracted and turned into gas. The gas is then transported through a secondary flow manifold to the thruster. One particular application uses a Hall thruster, where the gas is ionized, accelerated electrostatically, and ejected at high velocity to generate thrust.

Figure 1A:
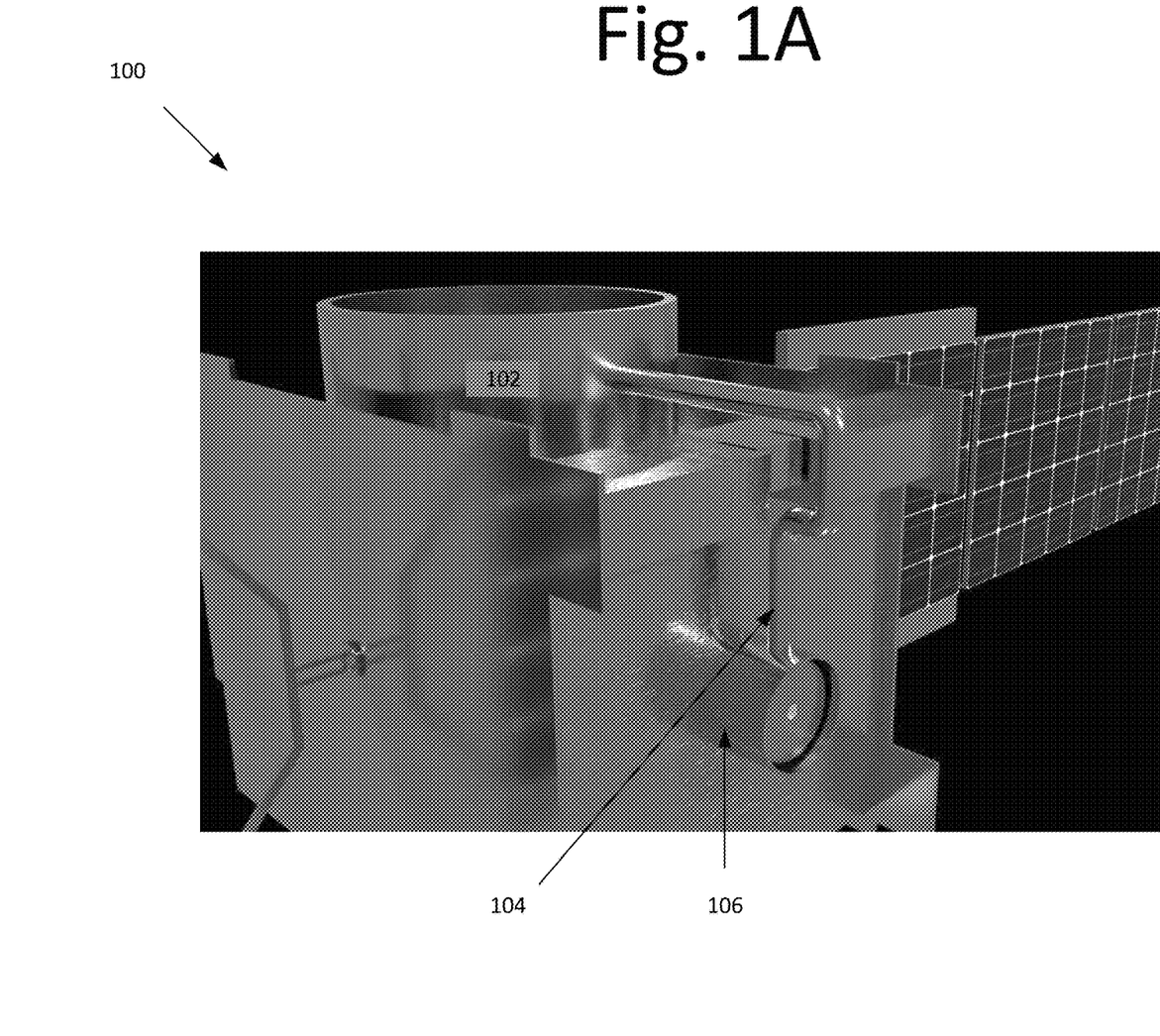
FIGS. 1A and 1B are images illustrating a vehicle configured to use applied heat loads for de-alloying, according to an embodiment of the present invention.
Figure 1B:
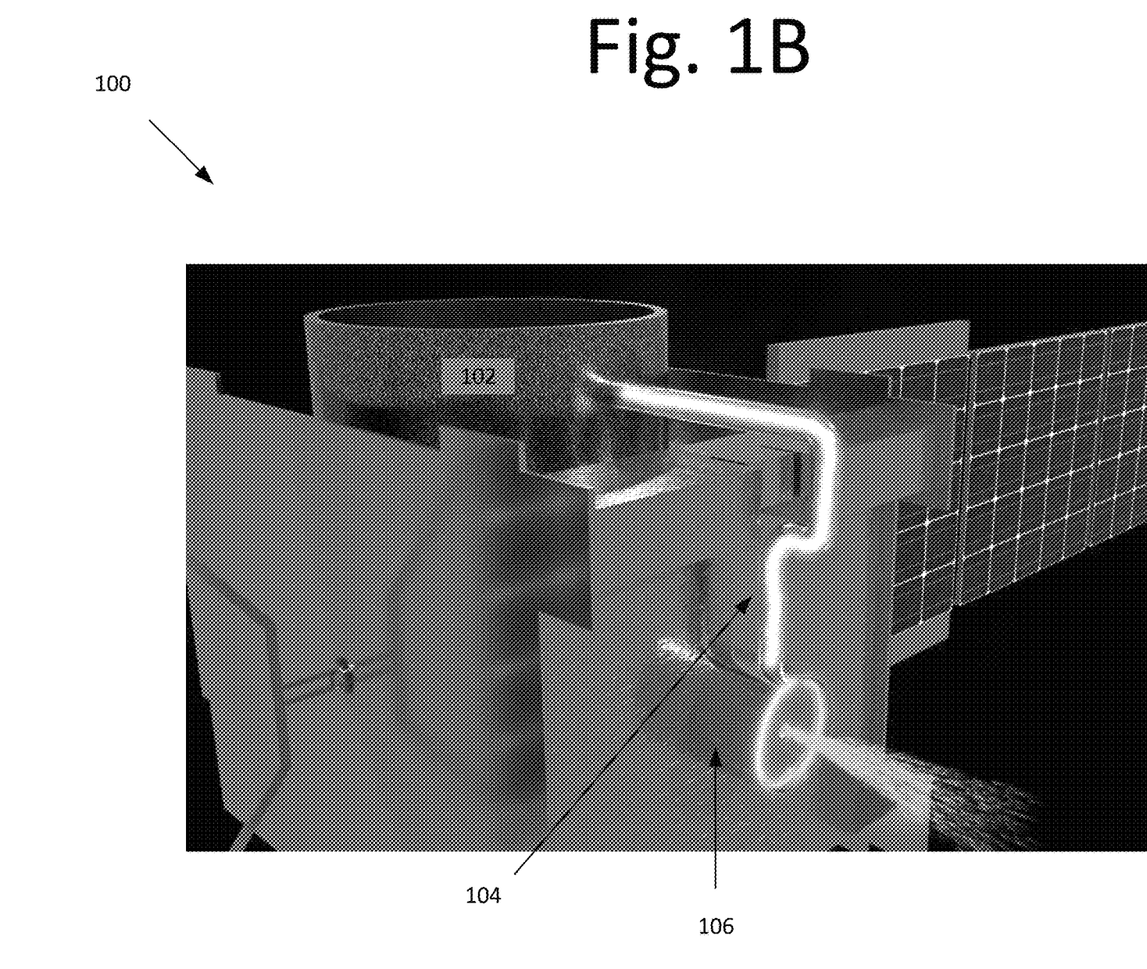

FIGS. 1A and 1B are images illustrating a vehicle 100 configured to use applied heat loads for de-alloying, according to an embodiment of the present invention. In some embodiments, a payload adapter ring 102 is composed of alloy material. In one example, $Co_5Zn_{21}$ alloy can release an estimated 80% of its initial mass as zinc vapor. Given this information, the estimated zinc mass that can be extracted by de-alloying the mass of various ESPA ring (EELV Secondary Payload Adapter) models is summarized in Table 1 below.

TABLE 1

| Variant | Estimated Zinc (Zn) Mass Extracted by Vapor Phase De-Alloying | |
|---|---|---|
| | Total initial mass (kg) | Zn produced average (kg) |
| Standard ESPA | 136 | 109.64 |

TABLE 1-continued

| Variant | Estimated Zinc (Zn) Mass Extracted by Vapor Phase De-Alloying | |
|---|---|---|
| | Total initial mass (kg) | Zn produced average (kg) |
| ESPA Heavy | 136 | 109.64 |
| ESPA Grande | 211 | 170.10 |
| Stretched ESPA | 286 | 230.56 |
| SL - ESPA | 59 | 47.56 |
| ESPAStar | 136 | 109.64 |

It should be appreciated that the data or estimates shown in Table 1 may vary depending on the material being used.

Although not shown, the alloy material is surrounded by an impermeable liner or "skin", "cladding material", to ensure that the gas does not simply diffuse into space. This impermeable liner, for example, is an elastomeric membrane or thin metallic sheet manufactured with gradient functionality (e.g., where the outer "skin layer" is not an alloy material and will not de-alloy, but the material properties change with depth to form a material that can be de-alloyed). The impermeable liner may envelop the adapter ring to cover all inscribed empty volume from the payload adapter, and thus, form an external propellant reservoir.

After the alloy material is de-alloyed, a secondary manifold 104 may transport the liquid or gas (hereinafter "propellant") from payload adapter ring 102 to a thruster 106 feed system (not shown). In the thruster 106 feed system, the propellant is converted to the physical state (e.g. gas) necessary for the thruster. See FIG. 1B, for example. By de-alloying material from the structure, and then transporting it to the thruster feed system, the excess mass has been converted to propellant gas, and can now be used to extend the life of 100 vehicle.

Although alloy material may be embedded within payload adapter ring 102 in this embodiment; other embodiments, however, may embed the alloy material in any suitable area of vehicle 100 that will allow sufficient de-alloying of the alloy material.

It should be appreciated that the embodiments are not limited to a satellite system, such as that shown in FIGS. 1A and 1B. In other embodiments, for example, the vehicle may be a lander, a rover, or any other ground or aquatic vehicle. See, for example, FIG. 7, which is a diagram illustrating a planetary lander 700, according to an embodiment of the present invention. In this embodiment, the structure of lander body 702 is composed of similar material to that discussed in FIGS. 1A and 1B, and is configured to absorb the stresses applied to the structure during landing on a planetary (or lunar) surface.

Figure 7:
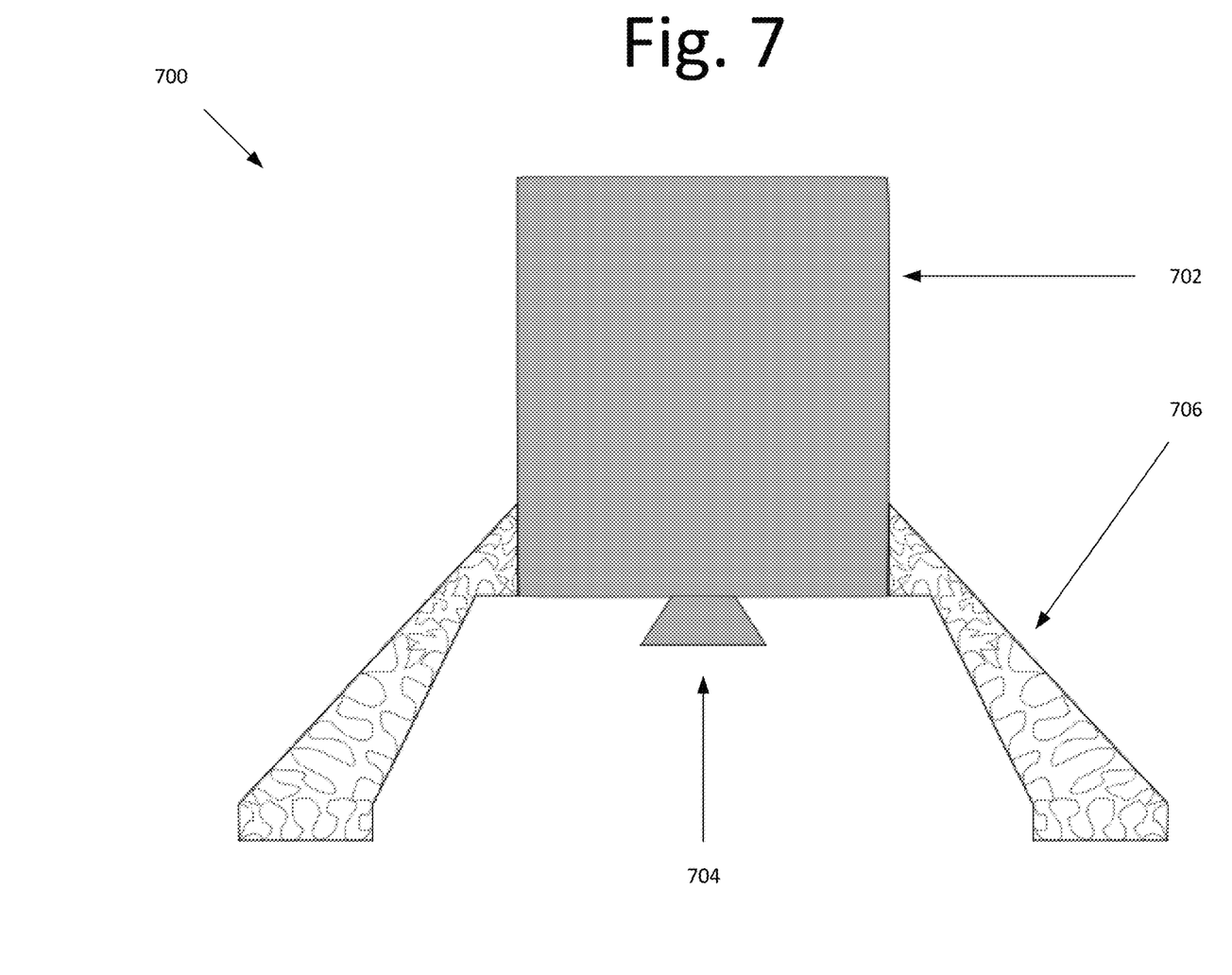
FIG. 7 is a diagram illustrating a planetary lander vehicle, according to an embodiment of the present invention.

Upon landing, platform 706 of planetary lander 700, which is composed of an alloy, is de-alloyed. The de-alloyed material is extracted from platform 706 and converted into propellant, which is in turn fed into propulsion system 704. This allows planetary lander 700 to use the converted material as propellant during take-off.

Figure 2:
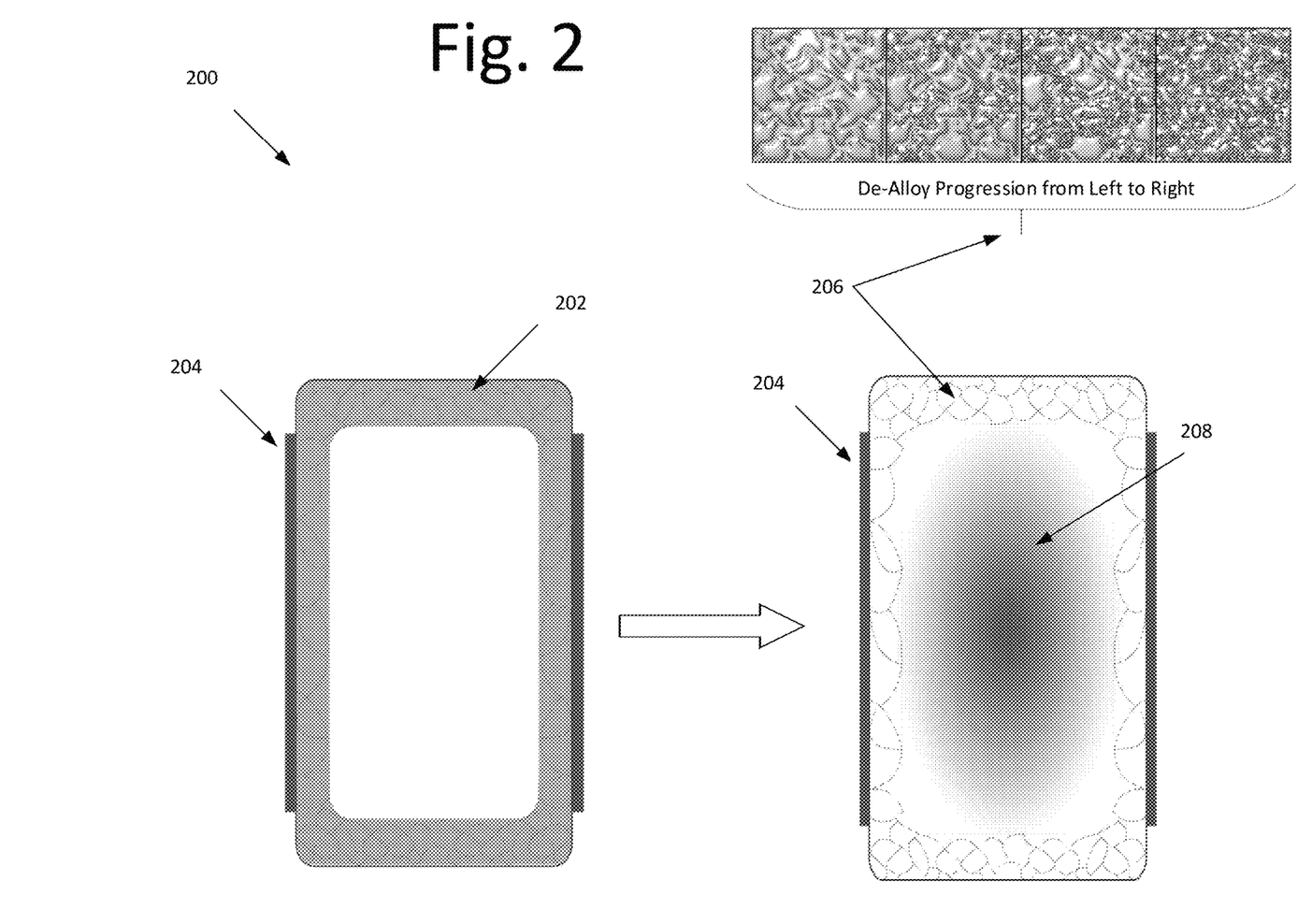
FIG. 2 is a diagram illustrating a propellant system configured to convert a constituent of the alloy material into gas, according to an embodiment of the present invention.

FIG. 2 is a diagram illustrating a propellant system 200 configured to convert alloy material into gas, according to an embodiment of the present invention. In some embodiments, walls 202 may be composed of, or embedded with, alloy material. There are multiple manufacturing technologies that allow alloy material to be deposited in the internal walls. For example, propellant or paste phase deposition of alloy material on the interior walls after the propellant tank shape has been produced. In another example, additive manufacturing can be used to create a gradient functionality in the wall where the material that forms the wall is different than the powder sintered on the interior walls. In yet another example, the separate-able material (e.g. de-alloy-able) form could first be produced which is then wrapped by an impermeable liner.

Although not shown, an impermeable liner may also exist on the exterior of walls 202. The impermeable liner may act as a skin covering the alloy material within the walls. It should be appreciated that the impermeable liner is heat resistant, meaning that it will not melt at high temperature. For the example given, de-alloying occurs at 499.85° C. (931.73° F.); however, other de-alloy forms could be produced that would operate at a lower temperature. For example, solder is a fusible metal alloy with a melting point range of 90-450° C. (194-842° F.) and may be integrated with a higher melting temperature metal, which forms a "scaffold" with the strength to hold the structure.

In certain embodiments, heat sources (e.g., heaters) 204 are placed on the exterior of walls 202. In alternative embodiments, an external energy source, such as the sun or lasers, may be used to deposit energy on the surface that is to be heated. For example, cobalt, which is a good conductor, may be used to pass current through the surface. Heaters 204, when turned on, are configured to de-alloy the alloy material to fill the volume within walls 202 with gas 208. It should be noted that after alloy material 202 is converted to gas, porous substrate 206 remains within walls 202. In the case of $Co_5Zn_{21}$, the remaining material, which forms a structural scaffold, is a nano-porous structure made of cobalt. The design of these materials would be such that the nano-porous scaffold left behind has the necessary mechanical, physical strength requirements for the vehicle in orbit (i.e., after passing through max-Q)

Figure 3:
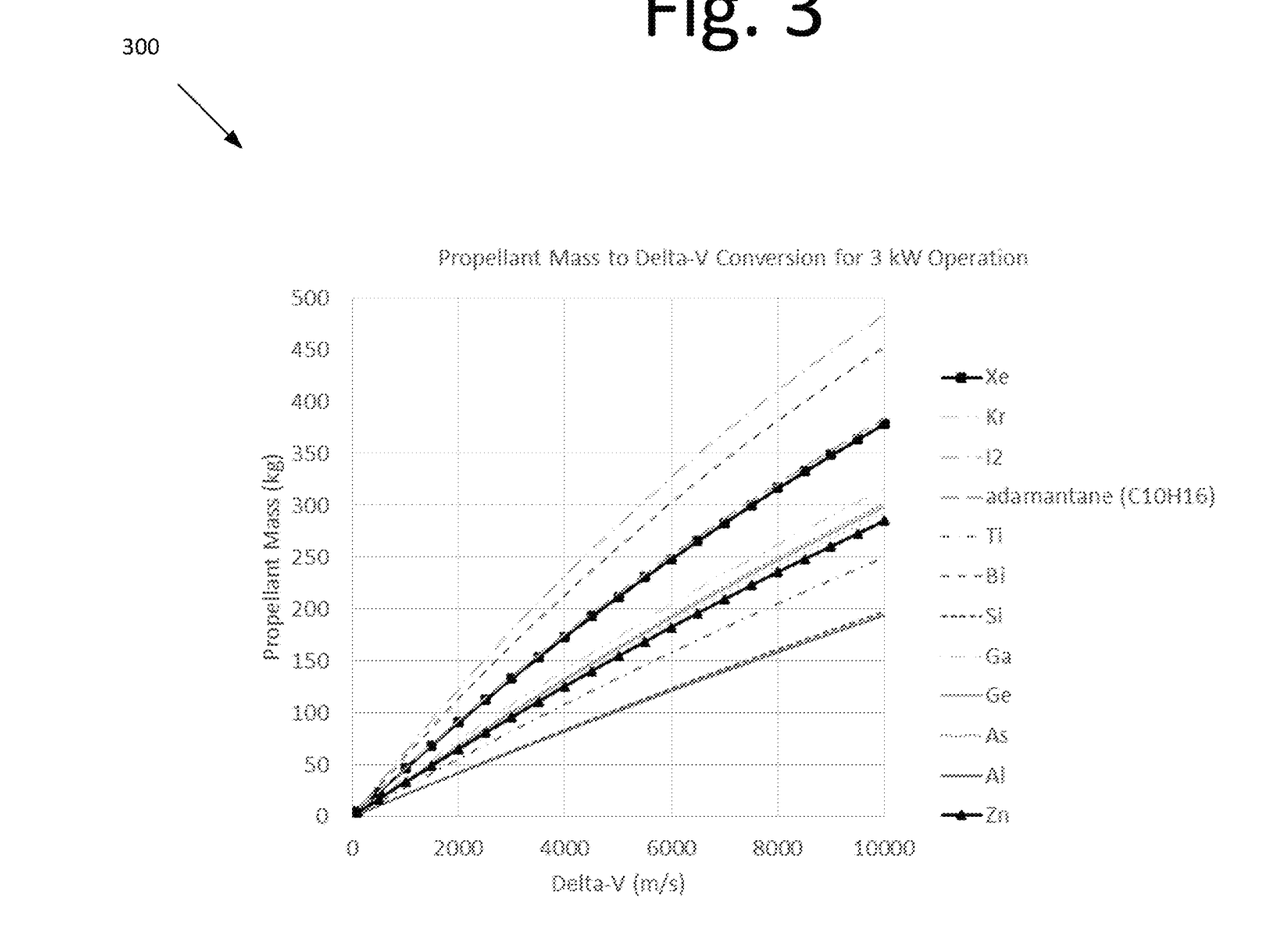
FIG. 3 is a graph illustrating propellant mass to delta-v conversion for a 20 kW Hall thruster in operation.

FIG. 3 is a graph 300 illustrating propellant mass to delta-v conversion for a 20 kW Hall thruster in operation. According to an embodiment of the present invention. Assuming de-alloying of an entire ESPA-ring made of $Co_5Zn_{21}$, it is expected to obtain between 3.5 and 7.5 km/s additional delta-v, depending on which ESPA-variant is considered (smaller or larger mass). In this analysis, it was assumed that the vehicle has a conservatively large 1 ton mass, and that smaller vehicles will gain even higher delta-v from similar amounts of propellant. These values are estimated from electrostatic acceleration at 20 kW (high power operation) with a discharge voltage of 400 V and a discharge current 50 A. The required flowrates vary for each gas, but for xenon (Xe), the estimate is 51 mg/s, and for Zn it is 25.4 mg/s.

FIG. 3 also shows the extra delta-V that could be gained if the extracted excess mass (i.e., the repurposed mass) converted to propellant is made of other materials. For instance, both metals, semiconductor materials are shown along with the traditional gases (e.g. Xe, Kr) and I2 and adamantane. The formation of de-alloy-able structures with these other materials remains an area of research. Iodine is a solid and can be converted to gas quite readily and this concept has been applied for Hall thruster propulsion in the past. However, the embodiments described herein are different, as the focus here is to embed the material in the structure and provide support during launch. In contrast, the past work used a more conventional concept of having the solid iodine contained in a tank, without playing any other roles on the spacecraft. They key difference is that the embodiments focus on the conversion of an existing part of the spacecraft into propellant (that is, not carrying extra propellant, in a tank). Some embodiments may focus on multifunctional materials.

Another option is adamantane, which is a crystalline solid and has an unusually high melting point for a hydrocarbon (melts at 270° C. 518° F.)

Figure 4:
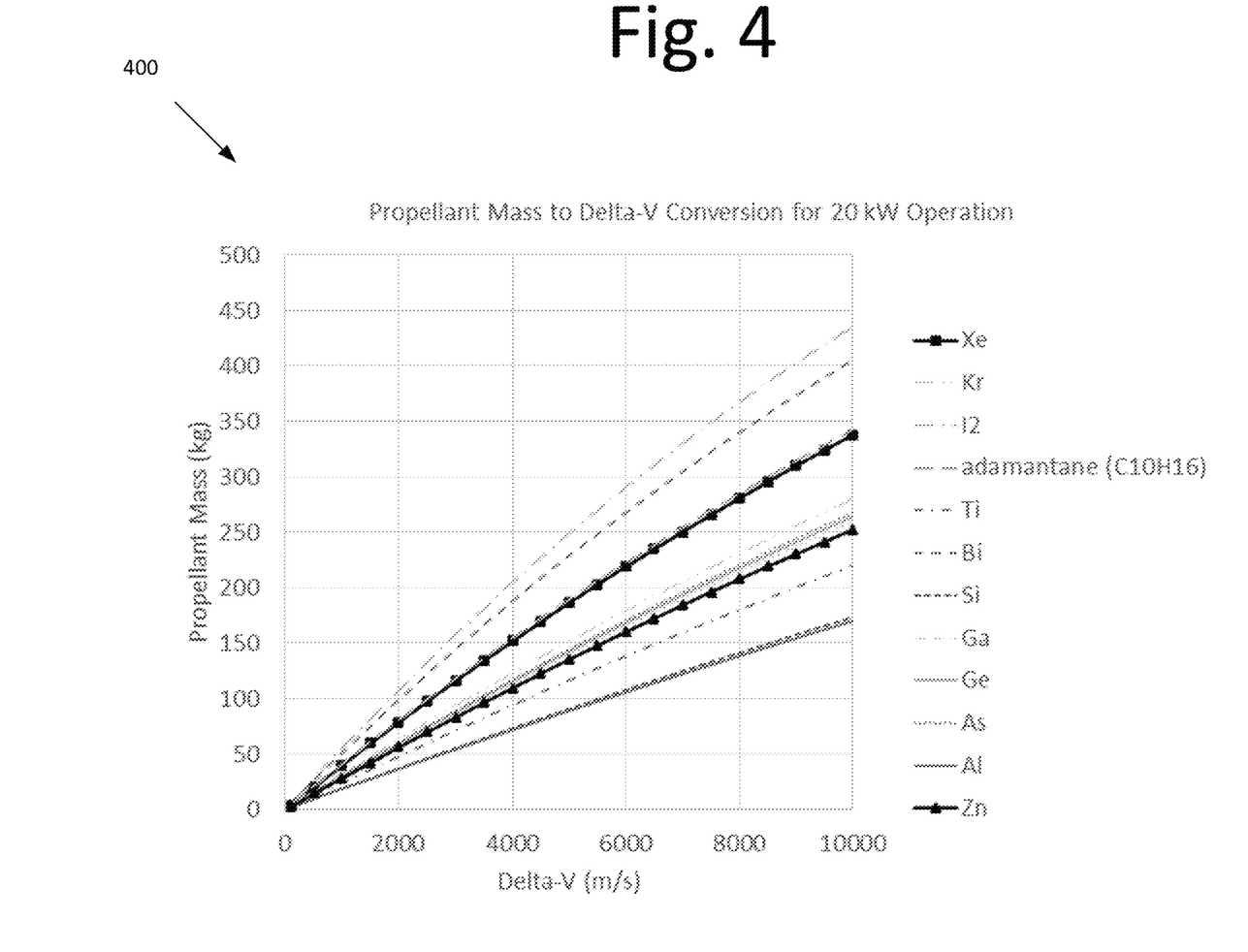
FIG. 4 is a graph illustrating a propellant mass to delta-v conversion for 3 kW (low power) Hall thruster operation, according to an embodiment of the present invention.

FIG. 4 is a graph 400 illustrating a propellant mass to delta-v conversion for 3 kW (low power) Hall thruster operation, according to an embodiment of the present invention. Like FIG. 3, assuming de-alloying of an entire ESPA-ring made of $Co_5Zn_{21}$, it is expected to obtain between 3 and 6.5 km/s additional delta-v. Additionally, the 3 kW low power operation has a discharge voltage of 300 V and a discharge current 10 A, and an initial vehicle mass of 1 ton is assumed for the delta-v calculations. The required flow-rates vary for each gas, but for Xe, the estimate is 10.2 mg/s, and for Zn it is 5.08 mg/s. The secondary flow manifold in this example is designed assuming the low-power operating mode for zinc, which fixes the flowrate to ~5 mg/s.

FIG. 4 also shows the extra delta-V that could be gained if the excess mass (i.e., the repurposed mass) converted to propellant is made of other materials. For instance, both metals, semiconductor materials are shown along with the traditional gases (e.g. Xe, Kr), as well as $I_2$ and adamantane. The formation of de-alloy-able structures with these other materials remains an area of research. Iodine is a solid and can be converted to gas quite readily while adamantane is crystalline solid and has an unusually high melting point for a hydrocarbon (melts at 270° C. 518° F.).

Figure 5:
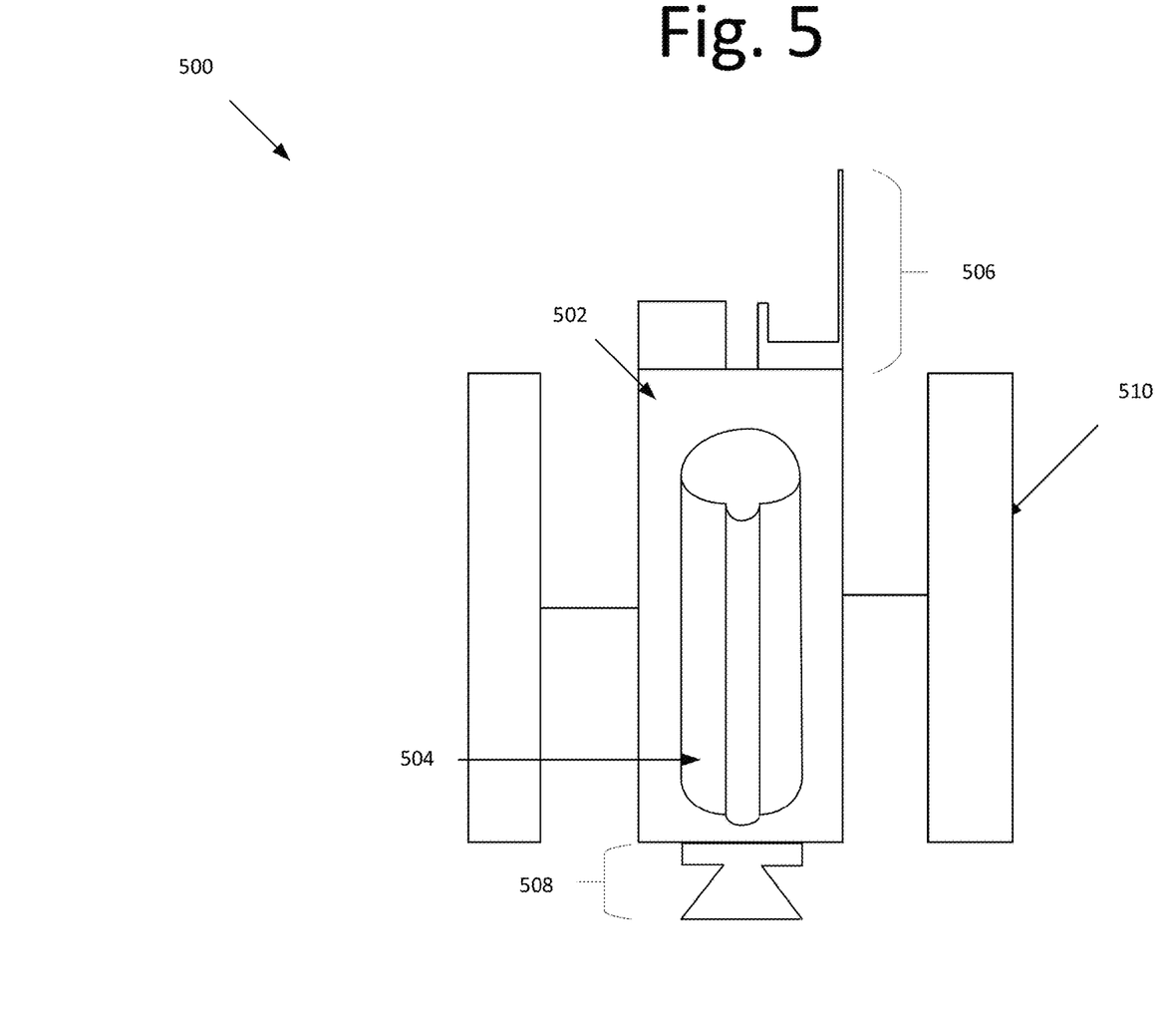
FIG. 5 is a diagram illustrating a vehicle equipped with repurposing material into propellant, according to an embodiment of the present invention.

FIG. 5 is a diagram illustrating a vehicle 500 equipped with repurposing material into propellant, according to an embodiment of the present invention. Normally, vehicle 500 includes a structure 502 and one or more propellant tanks composed of aluminum and/or titanium. However, for the purposes of de-alloying and extending the service life of vehicle 500, alloy material may be embedded within structure 502 and payloads 506, which are designed with limited mission utility (e.g. an Earth sensor for an interplanetary vehicle that has just left Earth' orbit for another planet).

Heaters, also not shown, are placed in strategic locations to efficiently convert the embedded material to propellant use, such as near the walls of structure 502 and payload 506 for the purposes of de-alloying. The heaters may be powered by way of solar arrays 510. When the heaters are turned on, alloy material is re-purposed into propellant and is carried into one or more propellant tanks 504 for storage. From there, the propellant can be moved into thruster 508.

In another embodiment, propellant tanks 504 themselves may be composed of alloy material. This way, when propellant tanks 504 become empty, the composition within the walls of the propellant tanks 504 may be extracted to refill the tanks.

Figure 6:
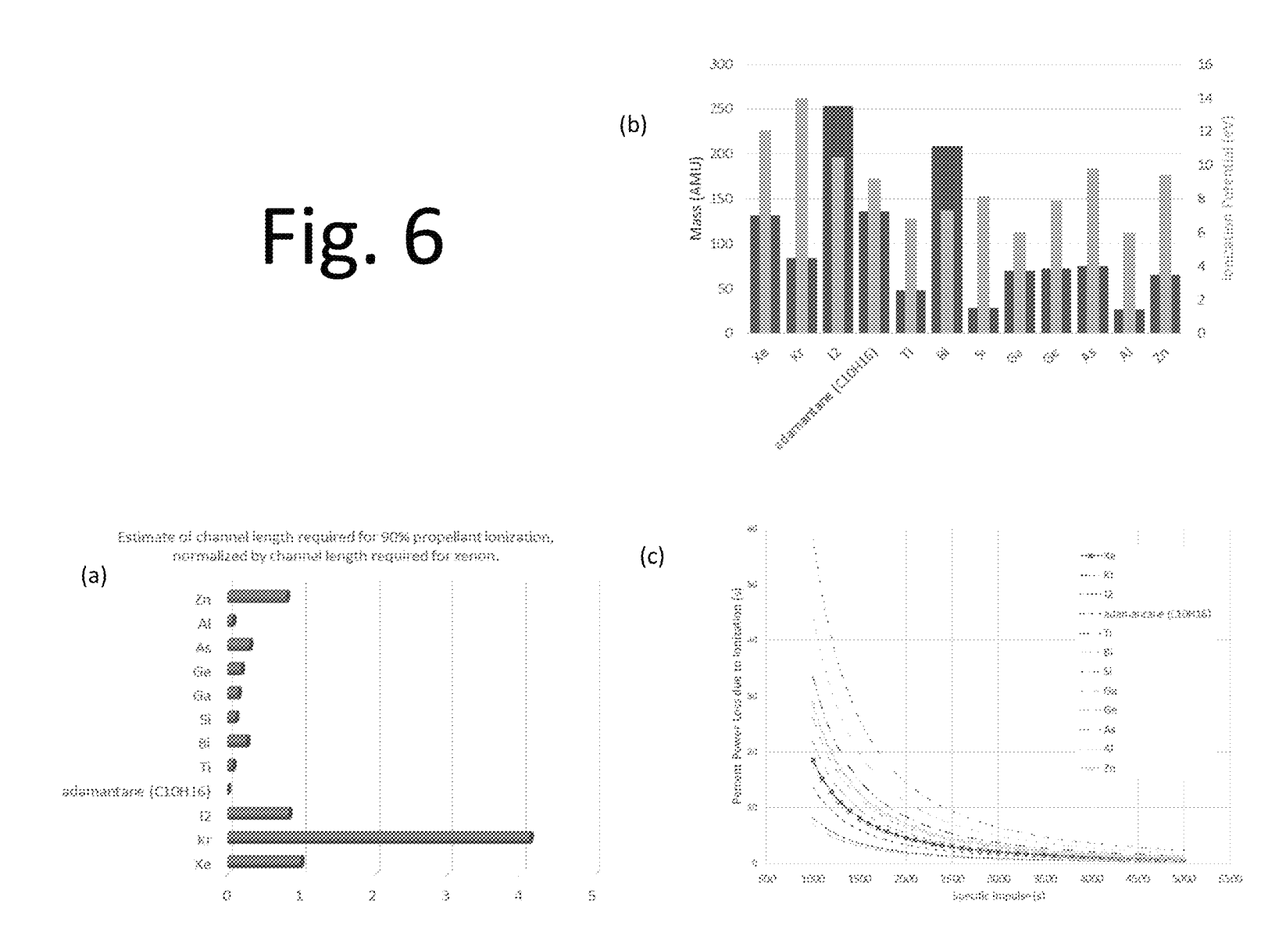
FIG. 6 are graphs (a)-(c) illustrating relative length of thruster channel for similar ionization efficiency, comparison of propellant properties, and estimated power losses in the ionization process, according to an embodiment of the present invention.

FIG. 6 are graphs (a)-(c) illustrating relative length of thruster channel for similar ionization efficiency, comparison of propellant properties, and estimated power losses in the ionization process, according to an embodiment of the present invention. The ionization mechanism in Hall thrusters is by electron-impact (collisions). Further, good Hall thruster propellants have a low ionization threshold and large mass. Depending on the propellant and how likely it is to ionize during a collision (defined by a measurable quantity called the ionization collision cross-section), a minimum residence time is required in the thruster channel to ensure that a certain percent of the propellant mass is ionized.

Graph (a) shows an estimate of channel length required for 90 percent propellant ionization, normalized by channel length required for Xe. As shown in graph (b), aside from krypton (Kr), all propellants are considered easier to ionize than Xe, and therefore, no changes in geometry are required. Further, power losses due to ionization (amount of energy not being used for acceleration) are higher for Zn than Xe. See graph (c).

Figure 8:
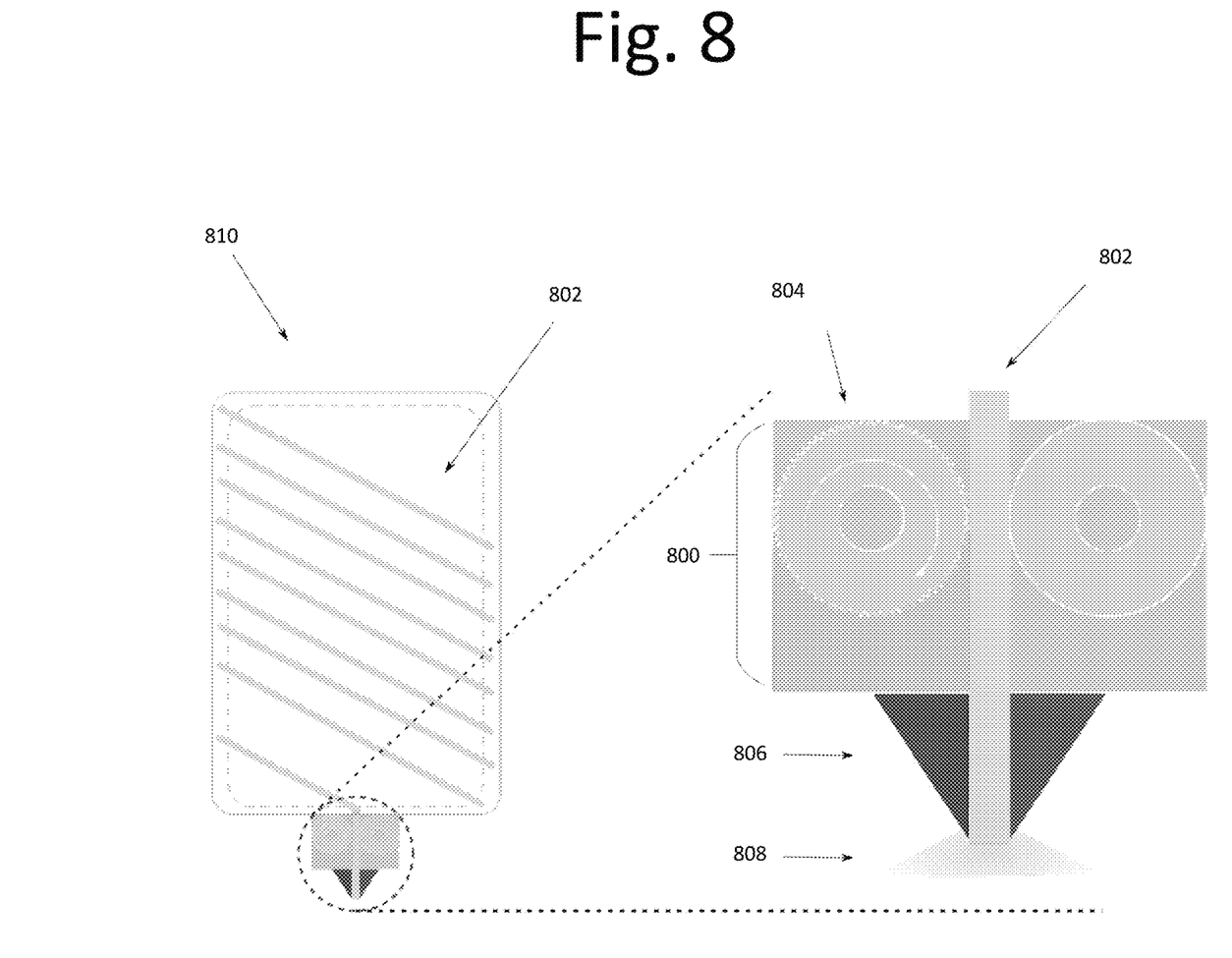
FIG. 8 is a diagram illustrating a propellant feed system, according to an embodiment of the present invention.

FIG. 8 is a diagram illustrating a propellant feed system 800, according to an embodiment of the present invention. In some embodiments, vehicle structure 810 is reinforced with solid rods and/or filaments 802. Beyond max-Q, propellant feed system 800 mechanically extracts the reinforcing material (solid rods and/or filaments 802) from the vehicle structure and converts the reinforcing material into propellant gas 808. This propellant gas may then be fed into thruster (not shown).

In an embodiment, solid rods and/or filaments 802 are extracted by an electro-mechanical device 804 such as with a grooved mechanism that impinges upon the filament and pushes it to a "digester" 806. Digester 806, for example, is a material processing device configured to convert solid rods and/or filaments 802 into propellant 808. For example, solid rods and/or filaments 802 are converted into propellant form 808 by way of heating. The propellant may then be fed to the propulsion system.

In another embodiment, electron sputtering or spark discharge may be used to decompose material 802 into constituents that can be "fed" into the thruster. In another embodiment, an onboard laser can be used to ablate material 802 to its basic constituents. Finally, in another embodiment, the design of 810 can be such that material 802 is subjected to focused solar heating, which converts the solid into constituent matter.

Figure 9:
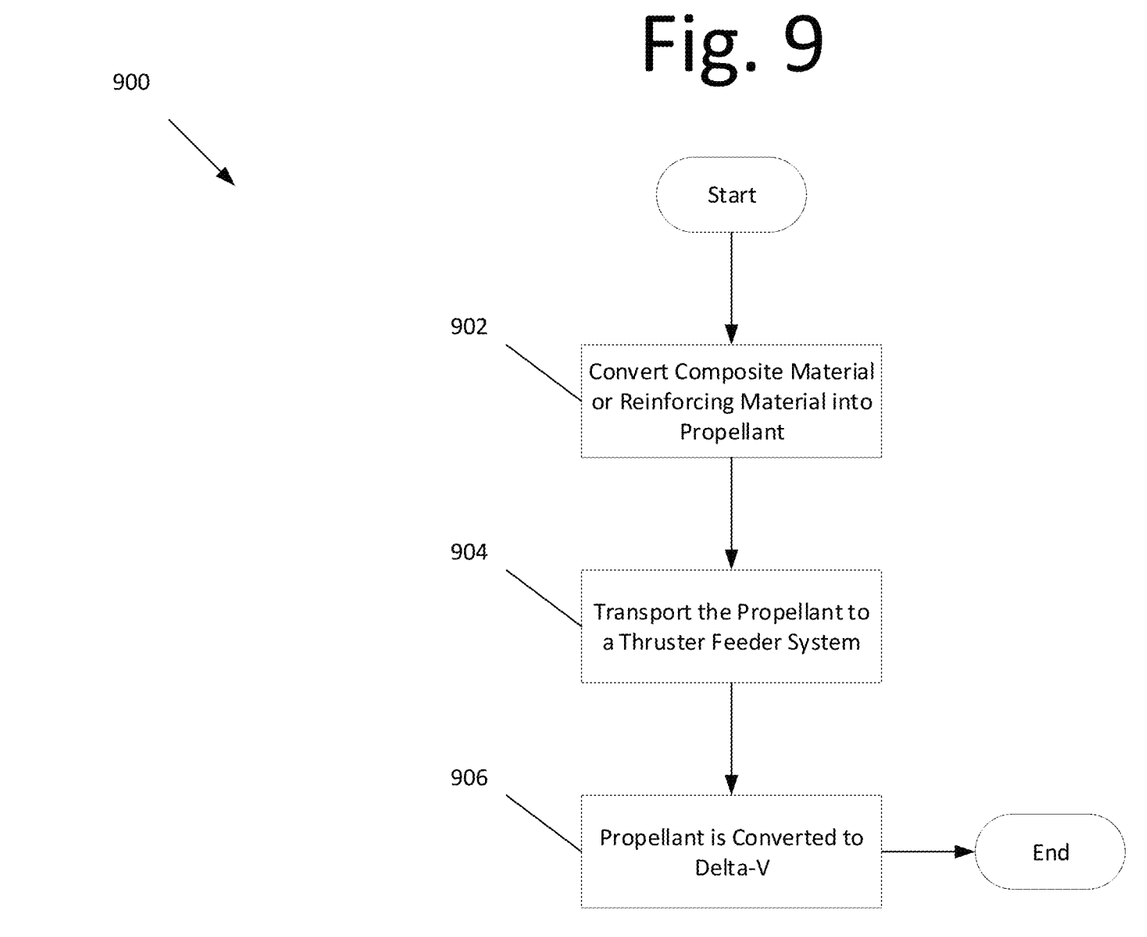
FIG. 9 is a flow diagram illustrating a method for converting a composite material or a reinforcing material into a liquid or solid form, according to an embodiment of the present invention.

FIG. 9 is a flow diagram illustrating a method 900 for converting a composite material or a reinforcing material into a liquid or solid form, according to an embodiment of the present invention. In FIG. 9, method 900 begins at 902 with converting the composite material or the reinforcing material into a propellant, after passing through a max-Q. The converting of the composite material or the reinforcing material includes heating the composite material or the reinforcing material to a predefined temperature such that the composite material or the reinforcing material turns into a propellant. At 904, the propellant is transported by manifold to a thruster feeder system, allowing the propellant to be used to extend the mission life of the vehicle. At 906, the propellant is converted to delta-v, which is accomplished by the thruster.

While some embodiments use de-alloy-able material; in another embodiment, a method to produce a composite material may be used. This composite material may have a lattice structure permeated by a second material, which later becomes the propellant. A visual example is a honeycomb lattice (i.e., the "structural member") permeated with honey (i.e., the "propellant"). The honeycomb design may have paths such that the converted material into propellant is directed out of the honeycomb and into the thruster. General terms for honeycomb type materials are architected materials or metal foams. Software that enables the design and manufacturing (e.g., additive manufacturing) of these lattice materials may be used. These lattice materials may conform to the strength requirements of the application. The architected materials tend to have large volumes of empty space, and the empty space can be filled by a material, which can be used as propellant. The material may be converted, by way of thermal or electrical techniques, into a liquid or gas. This gas can later be fed into a thruster. The integrated material becomes a composite, such that the mechanical and strength properties of the composite pass the requirements for launch, max-Q, etc. However, upon reaching the reduced gravitational forces found in orbit, the secondary material is converted to propellant leaving behind the architected lattice material. The lattice material would be much lighter in weight. As with the de-alloy example given above, the same functions are required in this embodiment (i.e., a means to convert the secondary material into a liquid or gas, a path to transfer the liquid or gas to the thruster, and a means to contain the liquid or gas so that it is not lost to outer space as it makes its way to the thruster and/or storage tank).

It should be appreciated that spacecraft are traditionally designed by precision engineered systems in which every particular structure, material, system has its specific function. This design approach reduces risk of failure on a system worth hundreds of millions to billions of dollars. Consequently, and in contrast to other businesses, the satellite industry is not one to incorporate innovation quickly and the "excess" mass produced by traditional design approaches has always been noted as part of the cost of the satellite business. Further, material science has advanced over the past 10 years to the point that complex materials, such as porous alloys, composites and architected materials, are now possible and can be produced with metered control of the desired properties. These materials were not deemed possible a decade ago, or even 5 years ago.

Mechanical engineering of structures has advanced over the past 10 years such that it is now possible to simulate on computers the structural properties of a material such as an architected material. Moreover, computational resources, at the desktop, are now far more powerful than a decade ago, allowing for investigation of both the linear and non-linear material properties. Further, it has been found that by exploiting a combination of linear and nonlinear properties, materials can now be designed that are structurally sound, but have very little mass. The development of additive manufacturing and a decade of progress in this field now allow very complex, but low mass, shapes to be manufactured. These structures are no longer 3D simulations, but real hardware that can be tested in the laboratory.

Software developments have also advanced to the point where they are not mere animations but are physics based. Moreover, the output from these software tools can now be directly transferred to manufacturing machines. The technology developments noted, when combined, permit ideas, such as those described herein, to be conceived. Couple this with the traditionalist thought processes, common in the space industry, make these embodiments nonobvious.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A vehicle, comprising:
a structure configured to hold one or more payloads and propulsion, wherein the structure becomes redundant after passing through a maximum mechanical stress environment, and the structure being a spacecraft structural element, providing structural support such that the vehicle survives the maximum mechanical stress environment during launch, and the structure comprises a material embedded within one or more walls of the structure and is configured to provide structural support for the vehicle; and
a plurality of heating elements surrounding an exterior of the one or more walls configured to extract the embedded material and convert the extracted material into a liquid or gas form to be used as propellant, the converted liquid or gas form is transferred to a reservoir to extend vehicle mission life in space.

2. The vehicle of claim 1, wherein the material is a composite material composed of a honeycomb type lattice or a plurality of multiform filled with constituents capable of being converted into the liquid or gas form when heated up to a predefined temperature.

3. The vehicle of claim 1, wherein the material is an alloy capable of being de-alloyed into the liquid or gas form when heated up to a predefined temperature.

4. The vehicle of claim 1, wherein the material is a reinforcing material composed of one or more rods or filaments capable of being converted into the liquid or gas form when impinged, heated, ablated, sputtered up to a predefined temperature.

5. The vehicle of claim 1, further comprising:
an impermeable liner on an exterior of the one or more walls configured to prevent the converted liquid or gas material from diffusing into space, wherein
the impermeable liner comprises an elastomeric membrane, a glass, or a metallic sheet manufactured with gradient functionality.

6. The vehicle of claim 4, further comprising:
a propellant feed system configured to extract the reinforcing material from the structure and convert the reinforcing material into the liquid or gas form.

7. The vehicle of claim 6, wherein the propellant feed system comprises an electro-mechanical device configured to impinge the reinforcing material, and push the impinged material into a digester.

8. The vehicle of claim 7, wherein the digester is configured to convert the impinged material into the liquid or gas form by way of heating.

9. The vehicle of claim 6, wherein the propellant feed system further configured for electron impact sputtering, laser ablation, focused solar light that impinges on the reinforcing material, and produces constituent matter as propellant.

10. A method of converting a structure of a vehicle into a propellant, comprising:
providing a structure configured to hold one or more payloads and propulsion, the structure being a spacecraft structural element, providing structural support such that the vehicle survives a maximum mechanical stress environment during launch, and the structure comprises a first material and a second material, the first material is configured to provide structural support for the vehicle, the second material is embedded on the first material providing structural support for the vehicle prior to being re-purposed into the propellant;
after passing through a maximum mechanical stress environment, the structural support of the second material becomes redundant and is re-purposed into the propellant,
extracting the second material embedded on the first material and converting the extract second material into a liquid or gas form to be used as the propellant, wherein the converting of the extracted second material comprises heating of the second material to a predefined temperature by a plurality of heating elements surrounding an exterior of the structure such that the embedded second material turns into the liquid or gas form; and
transporting, by a manifold, the liquid or gas propellant to a thruster feed system, allowing the liquid or gas propellant to be used to extend the mission life of the vehicle.

11. The method of claim 10, wherein the heating of the first material and second material of the structure comprises converting an alloy or constituents filled within a honeycomb lattice or a plurality of multiform structures of a composite material from a solid state to a gaseous state.

12. The method of claim 10, wherein, the first material is a reinforcing material, the heating of the first material comprises converting the second material comprising one or more rods or filaments within the reinforcing material from a solid state to a liquid or gas state by way of heating.

13. The method of claim 12, wherein the converting of the one or more rods or filaments comprises impinging the one or more rods or filaments, and heating the impinged one or more rods or filaments to a predefined temperature.

14. The method of claim 12, wherein the converting of the one or more rods or filaments comprises impinging the one or more rods or filaments by electron sputtering, laser ablation or focused solar light to heat the one or more rods or filaments to a predefined temperature or convert the one or more rods or filaments to constituent elements.

15. A vehicle, comprising:
- a structure is a spacecraft structural element, providing structural support such that the vehicle survives a maximum mechanical stress environment during launch, the structure is composed of an alloy composite or composite material, the structure comprising a first material and a second material, wherein the first material is a reinforcing material and the second material embedded on the first material configured to be re-purposed into a propellant, and
- the second material embedded on the first material is further configured to provide structural support for the vehicle prior to being re-purposed into the propellant;
- a plurality of heating sources surrounding the structure comprising of the first material and the second material configured to extract the embedded second material and convert the extracted second material into the propellant; and
- a transport device configured to transport the propellant from the structure to a reservoir or a thruster.

16. The vehicle of claim 15, wherein the composite material is composed of a honeycomb type lattice or a plurality of multiform filled with the second material comprising constituents capable of being converted into liquid or gas form when heated up to a predefined temperature.

17. The vehicle of claim 15, wherein the reinforcing material is composed of one or more rods or filaments capable of converting into liquid or gas form when impinged, heated, ablated, sputtered up to a predefined temperature.

18. The vehicle of claim 15, wherein the alloy is capable of being de-alloyed into the liquid or gas form when heated up to a predefined temperature.

19. The vehicle of claim 15, further comprising:
- an impermeable liner on an exterior of the one or more walls configured to prevent the second material which was extracted and converted into the propellant from diffusing into space, wherein
- the impermeable liner comprises an elastomeric membrane, a glass, or a metallic sheet manufactured with gradient functionality.

20. The vehicle of claim 15, further comprising:
- a propellant feed system configured to extract the second material embedded on reinforcing material from the structure and convert the second material into the propellant.

21. The vehicle claim 20, wherein the propellant feed system comprises an electro-mechanical device configured to impinge the reinforcing material and push the impinged reinforcing material into a digester.

22. The vehicle of claim 21, wherein the digester is configured to convert the impinged reinforcing material into liquid or gas form by way of heating.

* * * * *